US011297779B1

(12) United States Patent
Lund et al.

(10) Patent No.: US 11,297,779 B1
(45) Date of Patent: Apr. 12, 2022

(54) TRUE LIVING ORGANIC SOIL BED SYSTEM

(71) Applicants: Brian Roy Lund, Redmond, WA (US); Bryan Guy, Seattle, WA (US); Michael Roelfs, Seattle, WA (US)

(72) Inventors: Brian Roy Lund, Redmond, WA (US); Bryan Guy, Seattle, WA (US); Michael Roelfs, Seattle, WA (US)

( * ) Notice: Subject to any disclaimer, the term of this patent is extended or adjusted under 35 U.S.C. 154(b) by 0 days.

(21) Appl. No.: 17/398,223

(22) Filed: Aug. 10, 2021

Related U.S. Application Data

(60) Provisional application No. 63/064,599, filed on Aug. 12, 2020.

(51) Int. Cl.
*A01G 9/18* (2006.01)
*A01G 9/24* (2006.01)

(52) U.S. Cl.
CPC .............. *A01G 9/18* (2013.01); *A01G 9/246* (2013.01); *A01G 9/247* (2013.01); *A01G 9/249* (2019.05)

(58) Field of Classification Search
CPC ........ A01G 9/249; A01G 9/247; A01G 9/246; A01G 9/18; A01G 27/00; A01G 27/04
See application file for complete search history.

(56) References Cited

U.S. PATENT DOCUMENTS

| | | | | |
|---|---|---|---|---|
| 3,274,730 A | * | 9/1966 | Bose ........................ | A01G 7/02 47/1.01 R |
| 4,198,783 A | * | 4/1980 | Leroux ................... | A01G 31/02 47/60 |
| 4,569,150 A | * | 2/1986 | Carlson .................. | A01G 9/241 47/17 |
| 4,887,386 A | * | 12/1989 | Minshull ................ | A01G 31/02 47/48.5 |
| 5,044,117 A | * | 9/1991 | Kuckens .................. | A01G 7/02 47/59 R |
| 5,212,906 A | * | 5/1993 | Okuno .................... | A01G 31/02 47/62 N |
| 5,225,342 A | * | 7/1993 | Farrell ..................... | A01G 5/06 435/430 |
| 5,409,508 A | * | 4/1995 | Erickson ................. | C05F 17/90 47/1.01 R |
| 5,597,731 A | * | 1/1997 | Young .................... | A01H 4/001 435/284.1 |
| 6,502,350 B1 | * | 1/2003 | Dick ....................... | A01G 31/06 47/62 R |
| 8,281,946 B1 | * | 10/2012 | Broick ................. | B65H 75/364 220/23.86 |
| 9,622,426 B2 | * | 4/2017 | Ankner ................... | A01G 31/02 |
| 10,993,383 B2 | * | 5/2021 | Petrovffsky ............ | A01G 9/029 |

(Continued)

*Primary Examiner* — Monica L Barlow
(74) *Attorney, Agent, or Firm* — Law Office of Sam Sokhansanj PLLC

(57) ABSTRACT

A true living organic (TLO) plant growing system that allows soil to be reused for every new growth cycle. In one aspect, the TLO plant growing system of the solves the problem of preventing opportunities for anaerobic microorganism activity from building up within the soil thereby creating toxic chemicals that kill microbes beneficial to the growth of the plant. Specifically, the TLO system includes an aerated chamber between the bottom of the bed and the soil that the plants are growing to provide oxygen, carbon dioxide, water, and moisture to the TLO soil and plants and to promote optimal growing conditions, among other advantages disclosed herein.

10 Claims, 9 Drawing Sheets

(56) References Cited

U.S. PATENT DOCUMENTS

| | | | |
|---|---|---|---|
| 2006/0130546 A1* | 6/2006 | Beaton | C05F 17/00 71/24 |
| 2009/0187484 A1* | 7/2009 | Arbogast | A01N 59/04 705/14.36 |
| 2012/0083929 A1* | 4/2012 | Conrad, Jr. | A01G 27/02 700/284 |
| 2015/0007495 A1* | 1/2015 | Tseng | A01G 9/24 47/17 |
| 2017/0086397 A1* | 3/2017 | Sutton | A01G 9/029 |
| 2017/0156275 A1* | 6/2017 | Yano | A01G 7/02 |
| 2017/0305804 A1* | 10/2017 | Ayers | C05G 5/20 |
| 2018/0084743 A1* | 3/2018 | Thomas | A01G 9/02 |
| 2018/0125016 A1* | 5/2018 | Dufresne | A01G 9/246 |
| 2019/0059242 A1* | 2/2019 | Bogner | A61L 9/20 |
| 2019/0082606 A1* | 3/2019 | Moffitt | A01G 25/16 |
| 2019/0261587 A1* | 8/2019 | Abe | A01G 9/18 |
| 2020/0000045 A1* | 1/2020 | Shelor | A01G 9/246 |
| 2020/0008379 A1* | 1/2020 | Ayers | C05D 9/02 |
| 2020/0181867 A1* | 6/2020 | Moyher | E02D 31/02 |
| 2020/0214228 A1* | 7/2020 | Cho | A01G 9/26 |

* cited by examiner

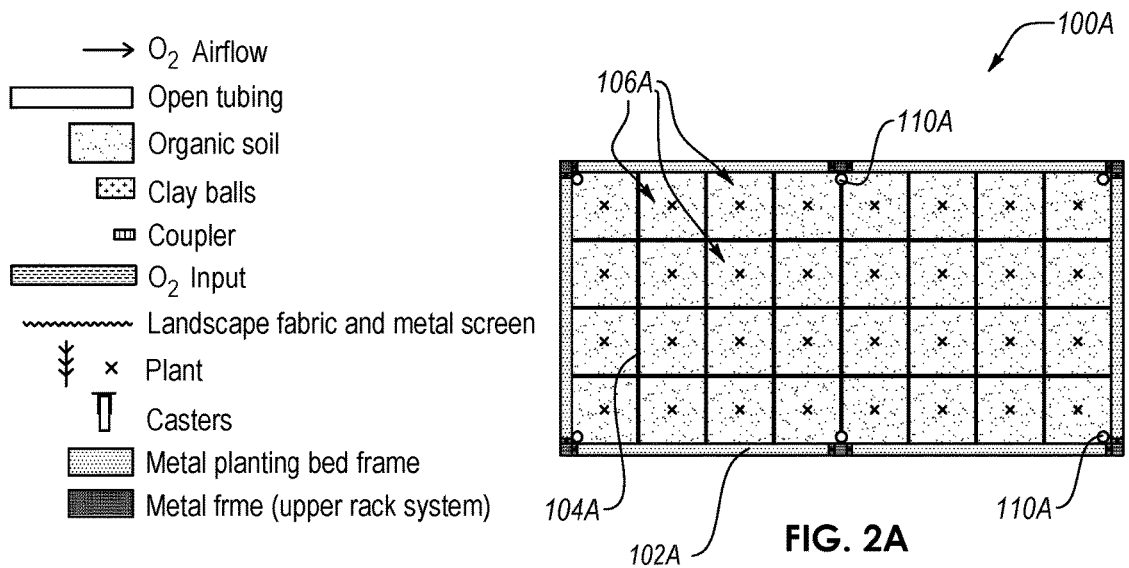
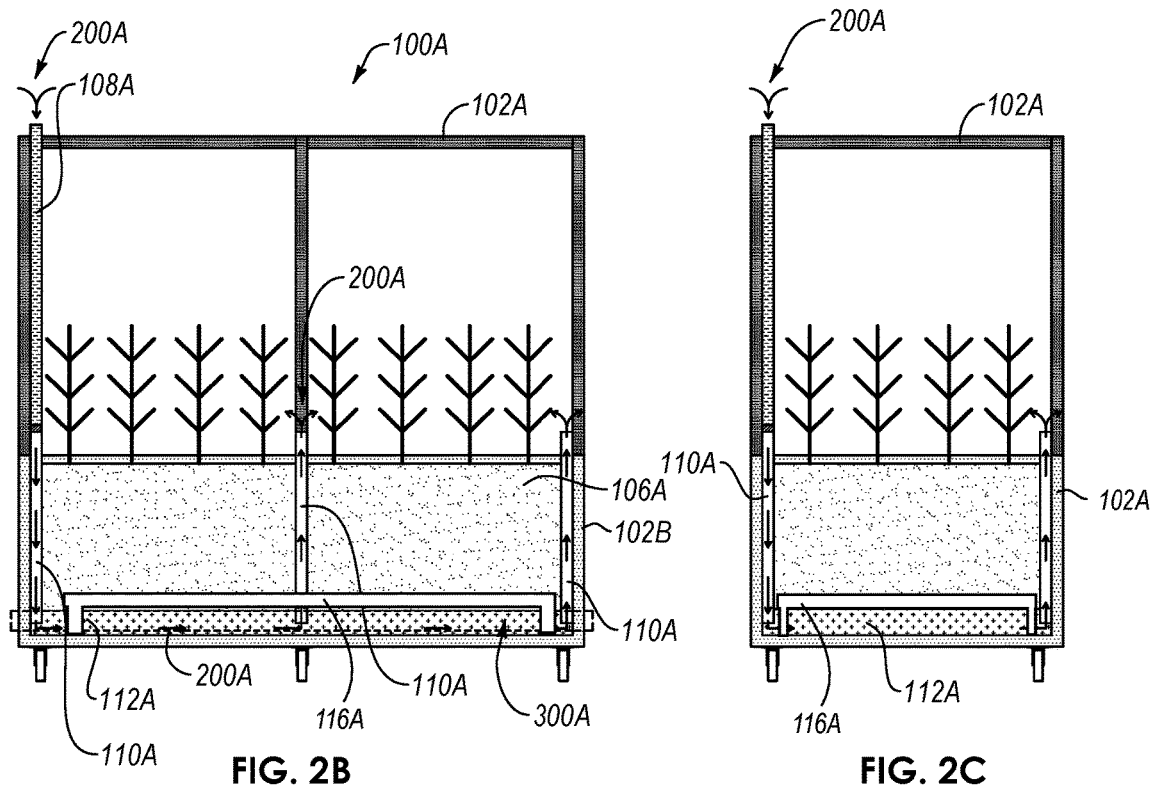
FIG. 2A
FIG. 2B
FIG. 2C

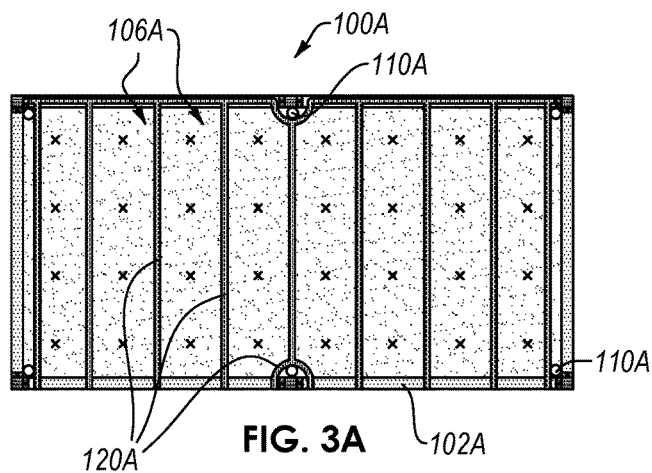
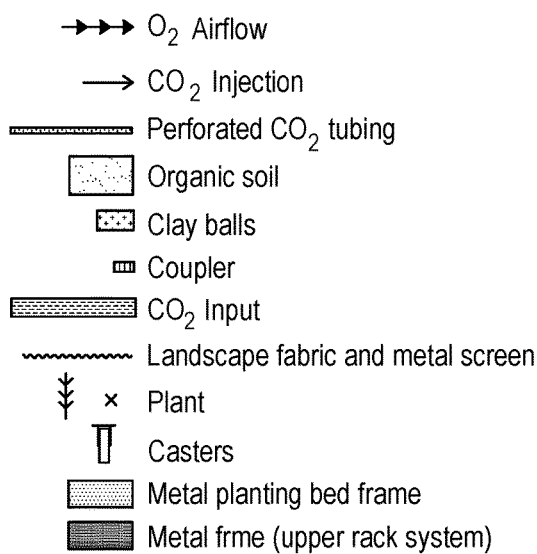
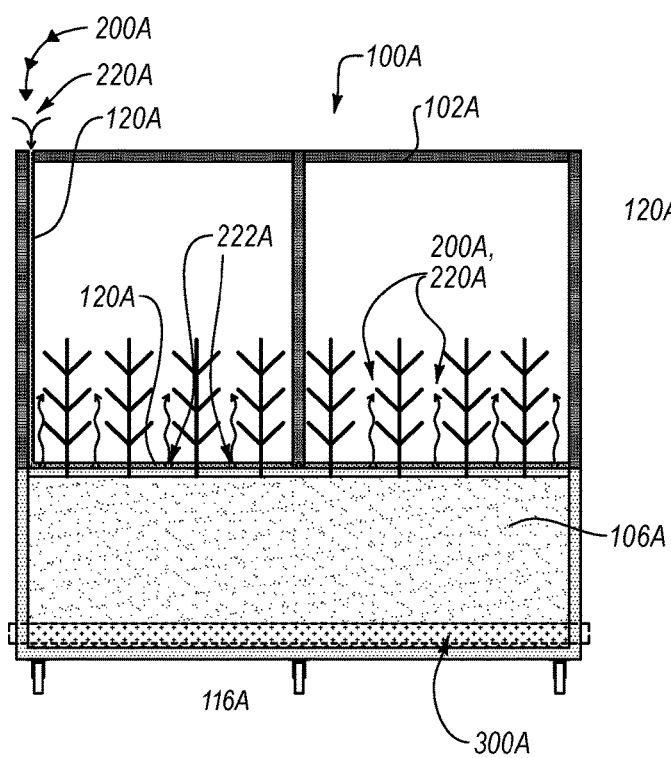
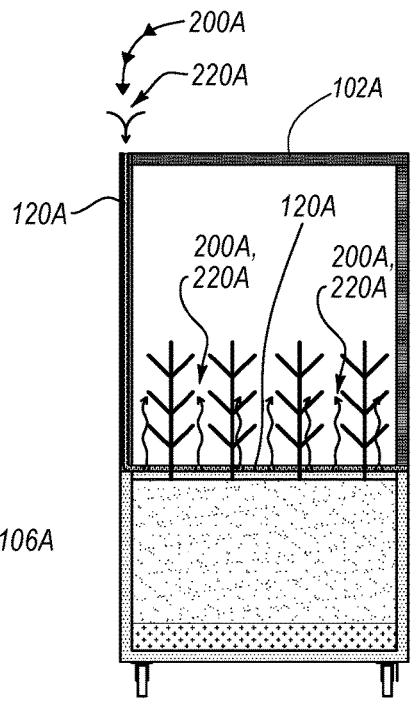
FIG. 3A
FIG. 3B
FIG. 3C

A - A

TRUE LIVING ORGANIC SOIL BED SYSTEM

CROSS-REFERENCE TO RELATED APPLICATION

This application claims the benefit of U.S. Provisional Application No. 63/064,599 filed on Aug. 12, 2020, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

True living organic (TLO) soil or organic soilless medium is generally soil that is alive with microbiology that feeds the plant as nature intended, such as beneficial fungi, bacteria, and various microbes. Generally, the root system of a plant sends chemical signals, called exudates, to the micro-organisms in the soil where they exchange nutrients in a symbiotic relationship. The soil's ecosystem, also known as the soil food web, is a hierarchy of micro-organisms that work symbiotically with a plant in order to help the plant grow optimally. Optimal soil maintenance starts with mitigating opportunities for anaerobic micro-organism activity from building up within the soil thereby creating toxic chemicals that kill microbes beneficial to the growth of the plant. This build up often happens at the bottom of the bed, where the roots, soil, and water coalesce.

After a growth cycle of a traditional potted plant, the conventional method is to dispose of the used and depleted soil and plant new soil for another growth cycle. However, this conventional method is not only wasteful and uneconomical, but can also slow the growth cycle of the next plant.

Hence, what is needed is a method, system, and apparatus that allows one to reuse the soil for every new growth cycle of a plant, thereby creating a microbe abundant and nutrient rich soil which promotes faster and healthier plant growth for every growth cycle and further reducing wasteful disposal of soil.

BRIEF SUMMARY

In one aspect of the disclosure described herein, a true living organic (TLO) plant growing system is disclosed that allows soil to be reused for every new growth cycle. In one aspect, the TLO system of the disclosure described herein solves the problem of preventing opportunities for anaerobic micro-organism activity from building up within the soil thereby creating toxic chemicals that kill microbes beneficial to the growth of the plant while simultaneously allowing oxygen to penetrate the bottom of the soil. Specifically, the TLO system creates an aerated chamber between the bottom of the bed and the soil that the plants are growing in. Hence, the TLO system of the disclosure described herein allows for the soil to stay in its bed indefinitely as the soil microbiology improves over time. Further, one or more casters under the bed allow it to be moved in and out of different growing environments, thereby providing versatility and an increased ability to hone the environment to what the plants need at that point in their growth cycle. The ability to use a soil over and over for the same crop helps the crop being grown to feel "at home" right away with the micro life that is specifically propagated and created over time in that soil which optimizes the plant's growth. Accordingly, the ability to reuse the soil saves time and money because one does not have to dispose of the toxic, unusable soil after the growth cycle is complete, thereby saving time, labor, and costs.

In another aspect of the disclosure described herein, the TLO system of the disclosure described herein can be a plug and play (or modular) true living organic soil bed growing structure and system which can be mounted on multiple castors or wheels. This allows mobility of the plant growing pods within and between various growing environments. It can also be used as a single standalone system or grouped together in a larger warehouse type configuration, which allows for the maximum efficiency in utilizing space and resources. Here, the TLO system of the disclosure described herein can include but is not limited to a 4'×4' or 4'×8' pod or bin that is a thriving ecosystem with a focus on plug and play (or modular) components that are interchangeable between other pods. The pod itself is designed to maintain the ideal TLO soil and atmospheric conditions necessary to keep the TLO soil's microbiology alive, thriving, and improving over time.

In addition, the TLO system of the disclosure described herein includes a soil platform that creates the eco-chamber that is an air circulation system configured to allow natural flowing air or pushed air through the eco-chamber below the soil. Hence, this allows the TLO soil to maintain its organic microbiology while, at the same time, preventing the otherwise inevitable buildup of harmful toxins and unwanted pests/predators that are attracted to the anaerobic and toxic environment that traditionally deteriorates soil, making it unusable. Here, not only does the system allow for the continuous use of the same TLO soil crop after crop, the crop itself communicates with the micro life in the TLO soil. The constant and continuing interaction between the plant's roots system and the micro life in the TLO soil allows for the plant to improve the TLO soil and the soil to improve the plant over time. The quality of TLO soil will increase, but, so too, does the consistency in crop production and quality because the TLO soil is continually tuned by and for that specific plant that is planted.

In particular, the TLO system of the disclosure described herein is able to combine oxygen ($O_2$) circulation under the soil's beds, an O2 vertical flow system, a targeted $CO_2$ delivery system, an above the plant air circulation and exhaust system, photon reflective and atmospheric side panels, a bungee style plant support system (e.g., a trellis), and a versatile light mounting system to provide an economical, efficient, and effective plant growing system. In another aspect of the disclosure described herein, the TLO system can include a bin that houses a soil platform that supports the soil and creates an aerated region below the soil, a vertical oxygen flow module, a carbon-dioxide injection module, a fan module, a watering module, and a lighting module. In another aspect of the disclosure described herein, the TLO system includes a housing having soil disposed therein and an open aerated region under the soil, a bin that houses a soil platform that supports the soil and creates an aerated region below the soil.

In another aspect of the disclosure described herein, a true living organic soil system is disclosed having a housing, an oxygen dispensing module or unit, a carbon dioxide dispensing module or unit, a watering module or unit, and a lighting module or unit. The system may also include soil disposed within the housing and an open aerated region under the soil. Further, the oxygen dispensing module can include a plurality of tubes that extend from an upper region of the housing to the lower region of the housing. In addition, the carbon dioxide dispensing module can include a plurality of tubes that extend from an upper region to the top of the soil within the housing. The system may also include a circulation fan module, wherein the circulation fan module can be configured to divert carbon dioxide gases released from the carbon dioxide module upwards. In addition, the oxygen dispensing module can further include a fan injection unit. The system may also include a support platform disposed within the housing. Here, the support platform can include a grid or lattice configuration. In addition, the support platform can further include an open aerated area underneath, such that the open aerated area under the support platform receives oxygen gas.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 2A illustrates a simplified top view of the TLO plant growing system, method, and apparatus of the disclosure described herein, illustrating an oxygen ($O_2$) circulation system.

FIG. 2B illustrates a simplified cross-sectional side view for the drawing of FIG. 2A.

FIG. 2C illustrates a simplified front view for the drawing of FIG. 2A.

FIG. 3A illustrates another simplified top view of the TLO plant growing system, method, and apparatus of the disclosure described herein, further illustrating a targeted carbon dioxide ($CO_2$) delivery system and a vertical $O_2$ flow system.

FIG. 3B illustrates a simplified cross-sectional side view for the drawing of FIG. 3A.

FIG. 3C illustrates a simplified front view for the drawing of FIG. 3A.

DETAILED DESCRIPTION

Figure 1:
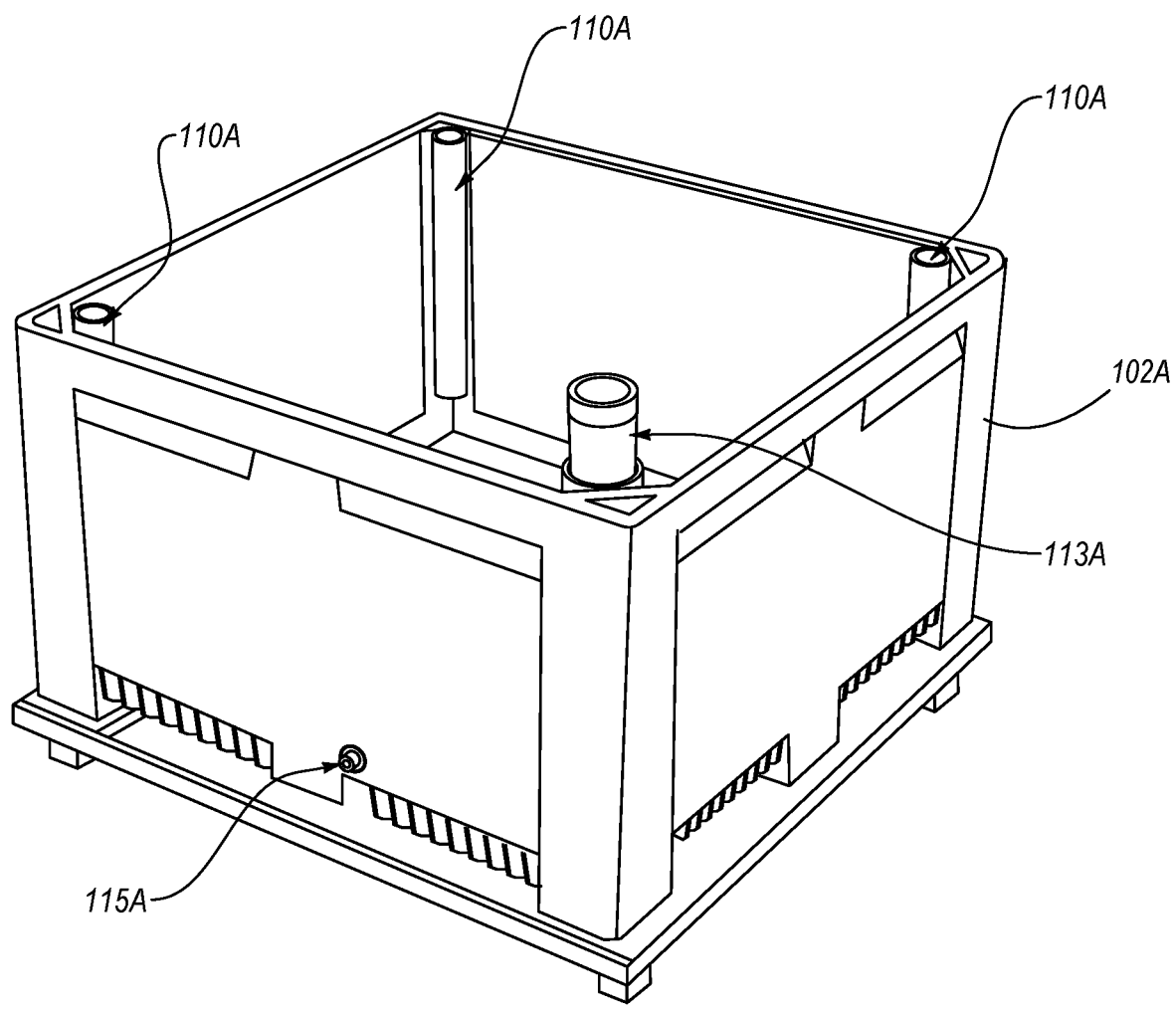
FIG. 1 illustrates a perspective view for one non-limiting exemplary embodiment of the TLO planting growing system and apparatus of the disclosure described herein.

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

In one implementation of the disclosure described herein, a display page may include information residing in the computing device's memory, which may be transmitted from the computing device over a network to a central database center and vice versa. The information may be stored in memory at each of the computing device, a data storage resided at the edge of the network, or on the servers at the central database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones such as cellular phones (e.g., an iPhone®, Android®, or any "smart phone"), a personal computer, iPad®, server computer, or laptop computer; personal digital assistants (PDAs), such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including Bluetooth®, near-field communication (NFC), infrared (IR), and Wi-Fi functionality, among others.

Phrases and terms similar to "software", "application", "app", and "firmware" may include any non-transitory computer readable medium storing thereon a program, which when executed by a computer, causes the computer to perform a method, function, or control operation.

Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, features, options, and/or attributes of the disclosure described herein. For example, the portal can be a web page accessed with a web browser, mobile device application, or any application or software residing on a computing device.

FIGS. 1-8B illustrates one non-limiting embodiment of the TLO system, method, and apparatus of the disclosure described herein. Referring to FIG. 1, TLO system and pod 100A of the disclosure described herein can include a framed metal open-top (or enclosed top) casing or housing 102B. Pod 100A can further include a plurality of piping or tubing 110A to assist with distributing or exhausting oxygen within pod 100A, and a drain plug 115A for dispensing water, sludge, or fluid contents from within pod 100A. Referring to FIG. 2A, one embodiment for an oxygen injection and circulation system via pressurized tubing system (or alternatively an inline fan injection system) is shown. Here, the TLO system and pod 100A includes the TLO soil 106A with seeds/plants planted therein and disposed in a lower half region of the framed housing or pod. The housing can include a modular top and lower tier rack frame 102A secured together and connected to vertical posts. Alternatively, frame 102A may be one unitary component or multiple modular pieces integrated and secured together. In addition, frame 102A may also include rolling casters to assist with moving the TLO system and pod to various environments.

Still referring to FIGS. 2A-2C, the TLO system and pod 100A can also include an oxygen ($O_2$) injection and circulation system. Specifically, tubing 108A can be secured along the upper region of frame 102A of the TLO system (such as along one of the vertical posts) that further extends towards the lower region of frame 102A, that can allow oxygen 200A to be sent via pressurized tubing or alternatively (or in addition to) via the inline fan injection system 113A directly below the soil platform 116A to the bottom region of 300A (ecochamber) to propagate through the TLO soil from the bottom toward the top. In particular, tubing 108A or alternatively (or in addition to) the inline fan injection system 113A can be further connected to a series of additional tubing 110A that extends to the lower region of frame 102A and further disposed in and around the frame of the TLO system and pod such as in the corner regions and mid-regions, as shown in FIG. 2A. It is contemplated within the scope of the present disclosure described herein that tubing 108A and 110A can be integrated as one tube or pipe. Here, tubing 110A allows the fresh oxygen 200A to be injected to an open space chamber or region 300A below the TLO soil. Specifically, region 300A can be an open air cavity or chamber that allows oxygen to flow therethrough below the TLO soil. In one embodiment, region 300A can include clay balls 112A having a wired mesh layer to further help support the TLO soil above it and further evenly distribute and propagate the injected oxygen throughout the cavity. In addition to or in lieu thereof, a soil platform support or lattice structure 116A may be disposed in the cavity region 300A. For example, any type of a support platform, cross-lattice structure, porous structure, or open-pore cellular foam structure may be disposed within region 300A, such as platform 116A, that can not only support the weight of the TLO soil 106A above it, but also assist with even distributing and propagating the injected oxygen within the bottom region 300A. In addition, tubing 110A can also assist with distributing or exhausting the oxygen to the surface of the soil and to the plants, as shown in FIGS. 2B-2C.

Still referring to FIGS. 2A-2C, the injected oxygen 220A consistently moving under the bed of soil keeps the soil fresh and oxygenated while preventing unwanted, anaerobic environment in the soil which causes a toxic build up within it. In particular, keeping the TLO soil fresh and oxygenated allows the microbiology within the soil food web to stay alive while continuing to improve and flourish. A wire-mesh liner accompanied with the installation of a landscape fabric laying on top of the soil platform 116A and clay balls creates a chamber under the bed which allows for water to travel underneath the soil. The air then travels through this chamber below the soil, the moisture is evaporated through the movement of the injected air and pushed upwards into the pod's enclosed atmosphere. In addition, as shown with respect to FIGS. 5A-5C and discussed herein, as water can also be controllably injected into the chamber region 300A, the moisture and humidity can also be controlled from under the bed to further facilitate growth of the plants. Accordingly, the foregoing systems help raise the humidity and allows the space under the bed to stay free of moisture, thereby preventing unwanted toxic conditions, among other advantages.

FIGS. 3A-3C illustrate the TLO system, method, and apparatus of the disclosure described herein including a vertical oxygen flow system and targeted carbon dioxide delivery and release system. Here, the TLO system and pod 100A include the TLO soil 106A with seeds/plants planted therein and disposed in a lower half region of the framed housing or pod. In addition, tubing 120A can be secured along the upper portion of frame 102A of the TLO system (such as along one of the vertical posts) that can allow oxygen 200A oxygen and carbon dioxide 220A to be sent or injected into the tubing and directly to the top surface region of the TLO soil where tubing 120A extends therethrough. In particular, tubing 120A can be further connected to a series of additional tubes 120A and be disposed near the surface (or on top) of the TLO soil. Here, the tubing 120A disposed laterally or substantially horizontally near the surface of the TLO soil 106A further include multiple perforations, holes, or apertures spaced apart from each other and directed towards the top (or northern direction). Specifically, as shown in FIG. 3B-3C, the perforations of tubing 120A allow the oxygen 200A and carbon dioxide gas 220A to be vertically injected from below the plants, in varying intervals. Here, the continuous oxygen 200A release flow and intermittent carbon dioxide 220A release flow allows for consistent exchange of fresh oxygen 200A and carbon dioxide 220A at the undersides of the plant's leaves, and which is further exhausted into the atmosphere. Here, it is contemplated within the scope of the disclosure described herein that the foregoing carbon dioxide system can co-exist and operate in combination with previously disclosed oxygen injection and circulation. In addition, the foregoing vertical $O_2$ flow and targeted $CO_2$ delivery system can also be coupled with the exhaust fan system discussed with respect to FIGS. 4A-4C.

Still referring to FIGS. 3A-3C, the foregoing vertical oxygen flow and targeted carbon dioxide delivery system are configured to dispense or thrust oxygen and carbon dioxide in an upwards manner or direction to the underside of the leaves, where the plant absorbs the $CO_2$. The underside of a leaf has what's called stomata. The stomata receives and intakes (or uptakes) the $CO_2$ from the atmosphere as it passes by the undersides of the leaves. Further, $CO_2$ is heavier than oxygen which makes it fall towards the ground, thus making it difficult to get a consistent flow of $CO_2$ directly to the part of the plant that most needs it. To overcome this, via the carbon dioxide injection system of the disclosure described herein, the pressurized $CO_2$ can blow or be dispensed gently up from beneath the plants and the exhaust fans 450A (FIGS. 4A-4B), thereby to further assist with pulling the $CO_2$ gases up past the stomata. In nature, the normal $CO_2$ levels in air are around 300 to 400 parts per million (ppm). The $CO_2$ injection system of the disclosure described herein provides the ability to inject much higher levels of $CO_2$ to the stomata of the plants than would normally be possible. At certain times in their growth cycle, some plants can absorb $CO_2$ up to 2000 ppm, making them grow more rapidly and efficiently. So, regardless of the type of crop or where it's at in its growth cycle, the system of the disclosure described herein will allow the grower to fine tune the optimal amount of $CO_2$ delivered to the plant at all times. Accordingly, the foregoing carbon dioxide delivery system has been shown through experimental testing to increase plant yields by about 30-40% with a single bed of TLO soil as compared to conventional or prior art systems. Still referring to FIGS. 3A-3C, the vertical oxygen flow system can create a wind tunnel effect throughout the plant's canopy which eliminates the need for additional horizontal fans around the grow space that have conventionally been used to move air throughout the plant's canopy, thereby further improving plant yields.

Figure 4A:
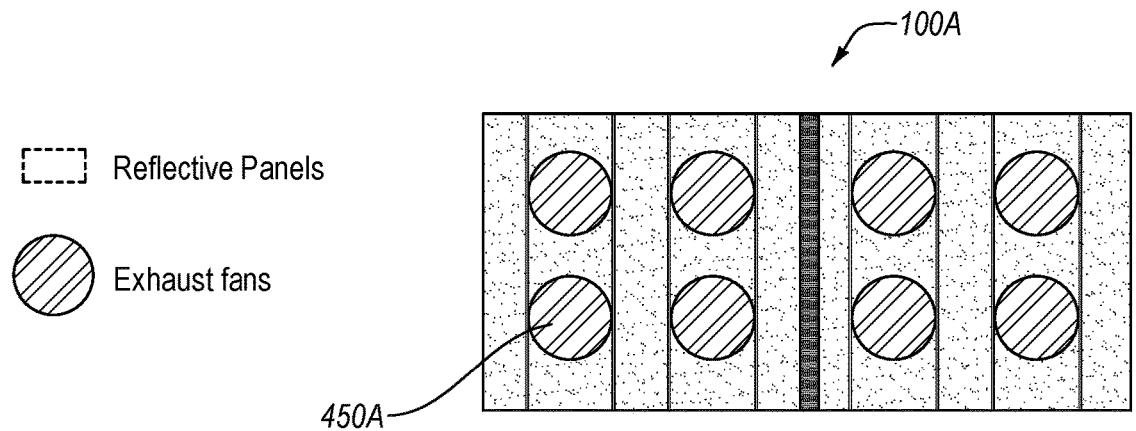
FIG. 4A illustrates another simplified top view of the TLO plant growing system, method, and apparatus of the disclosure described herein, further illustrating an exhaust and lighting system.
Figure 4B:
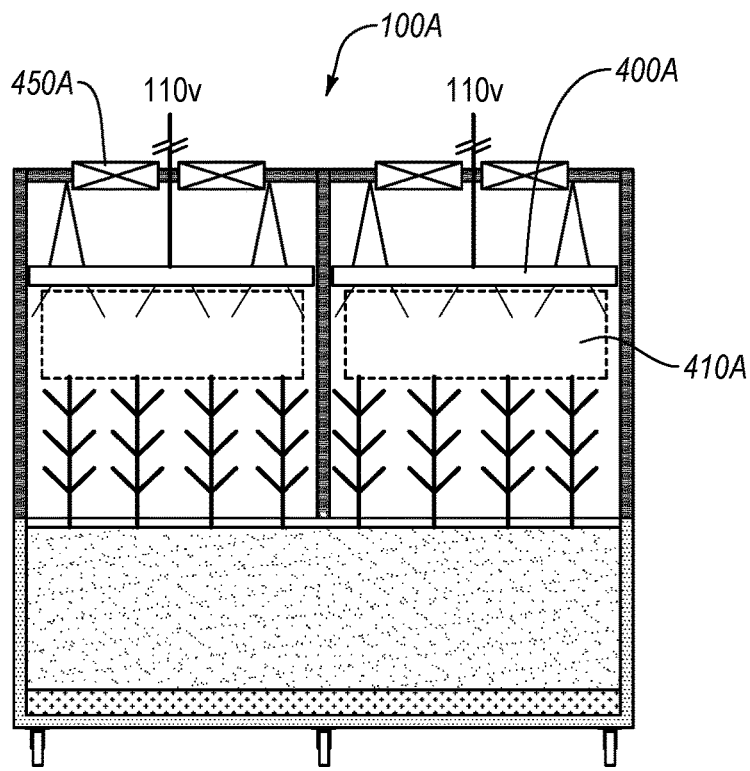
FIG. 4B illustrates a simplified cross-sectional side view for the drawing t of FIG. 4A.
Figure 4C:
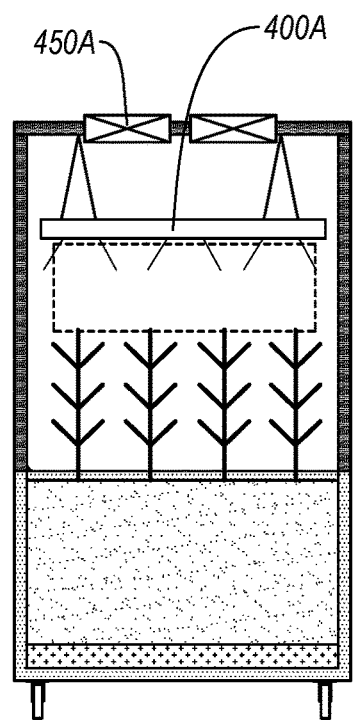
FIG. 4C illustrates a simplified front view for the drawing of FIG. 4A.

FIGS. 4A-4C illustrates the TLO system, method, and apparatus of the disclosure described herein including an exhaust fan system for assisting the disclosed carbon dioxide injection system, in addition to lighting. Specifically, the housing of the TLO system and pod 100A can include multiple exhaust fans secured to the top frame section of the housing, overhead the TLO soil and plants. In operation, the exhaust fans 450A assist with pulling the injected and released $CO_2$ gases to the atmosphere, among others. In addition, the exhaust fans help to cool down the TLO pod's growing atmosphere by pulling colder air up through the plant canopy and out of the pod's ecosystem. The fans also help to cool down the mounted grow lights below the fans by pulling air through and around the lights. The fans can be put in reverse to blow warm air down while the lights are off in order to increase the temperature of the pod's growing atmosphere. The foregoing operations of the exhaust fans help provide the entire room full of plants with a consistent environment in which they can flourish. In effect, the exhaust fans can save about energy costs, such as about 37% in one form of experimental testing compared to conventional systems, by providing a more efficient growing atmosphere for the plants.

Still referring to FIGS. 4A-4C, the TLO pod 100A or housing may also include multiple LED type of lighting 400A suspended from the top frame section via adjustable height cables to further set at various intensities and temperatures to further facilitate plant growth. In addition, the TLO pod or housing may also include light or photon reflective panels 410A secured to the outer perimeter of the housing to further reflect light from the LED lighting to sides of the plant. Here, the light or photon reflective side panels and lighting directions may all be adjustable as well. The foregoing panels force the light or photons that would usually be lost (any light not shining directly on a plant) to be reflected back into the pod and utilized by the plant. This helps maintain the pod's atmosphere by simply hanging the about 4'×(4', 3.5', 3', 2.5', 2', or 1.5') side panels to one or more prefabricated notches or brackets around the outside of the pod rack's vertical posts. These notches or brackets can be spaced about 1" apart, that can extend along the entire exterior of each rack system's vertical posts.

Still referring to FIGS. 4A-4C, the TLO system and pod 100A of the disclosure described herein also have the ability to be grouped together as multiple pods, which in effect can be used to create a larger ecosystem and atmosphere that takes less energy and resources to maintain than if the pods were all spaced apart. The light reflective/atmosphere control panels can be placed on the outside portion of the grouped pods, creating one large enclosed system. The light or photon reflective panels create a more efficient lighting system by not allowing light to escape or leak out. Here, the foregoing lighting system can allow one to obtain 20-25% more usable light on the plants inside the pod and allowing one to be much more efficient with their energy and equipment usage. Here, both the disclosed exhaust fan and lighting/reflective panel system can be used in conjunction with the previously disclosed oxygen and carbon dioxide injection systems to provide the most efficient method of growing plants.

Figure 5A:
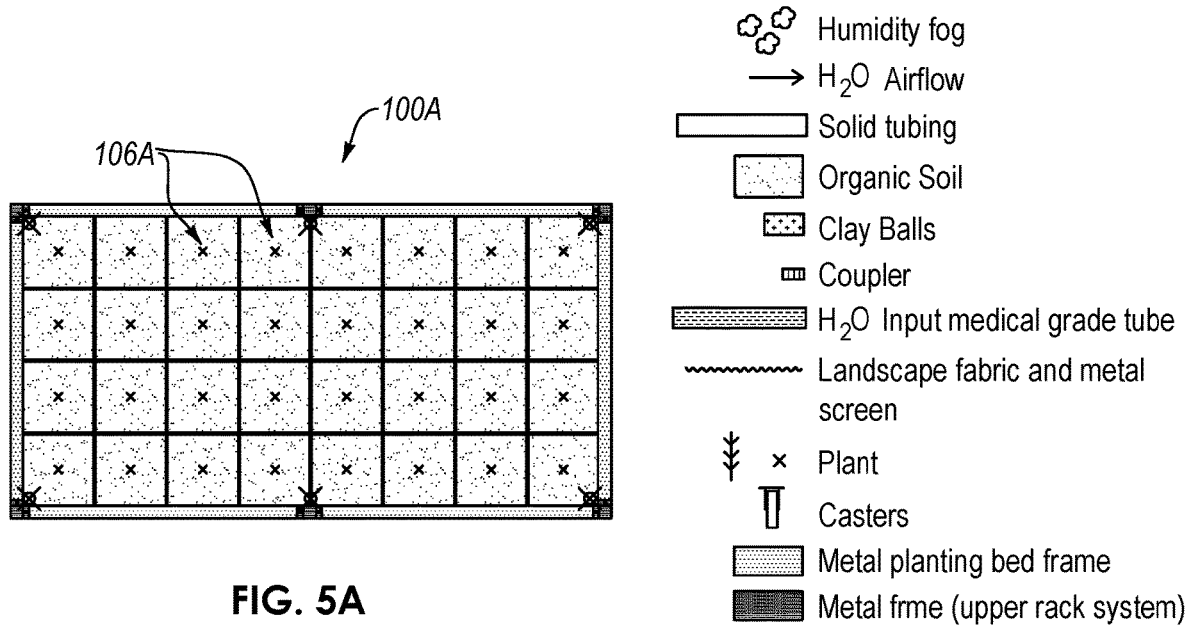
FIG. 5A illustrates another simplified top view of the TLO plant growing system, method, and apparatus of the disclosure described herein, further illustrating a moisture and humidity control system.
Figure 5B:
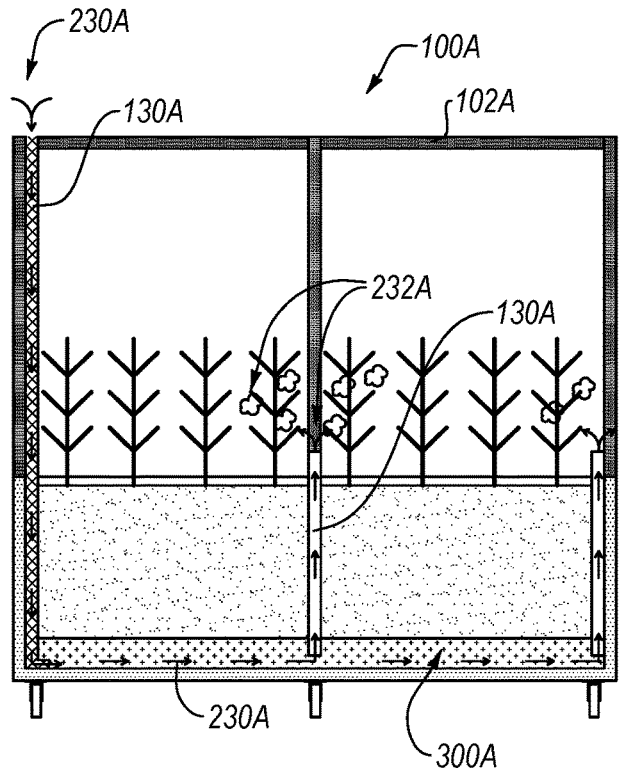
FIG. 5B illustrates a simplified cross-sectional side view for the drawing of FIG. 5A.
Figure 5C:
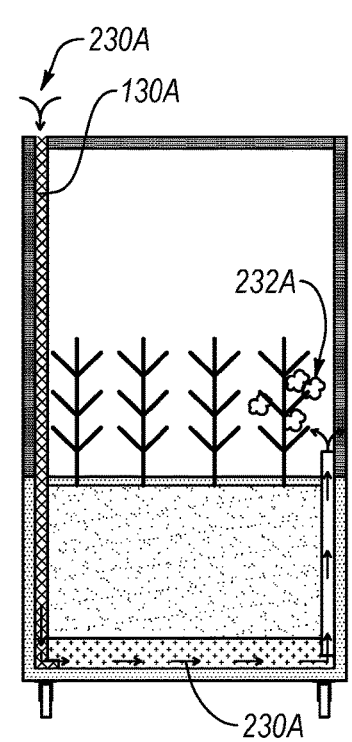
FIG. 5C illustrates a simplified front view for the embodiment of FIG. 5A.
Figure 6A:
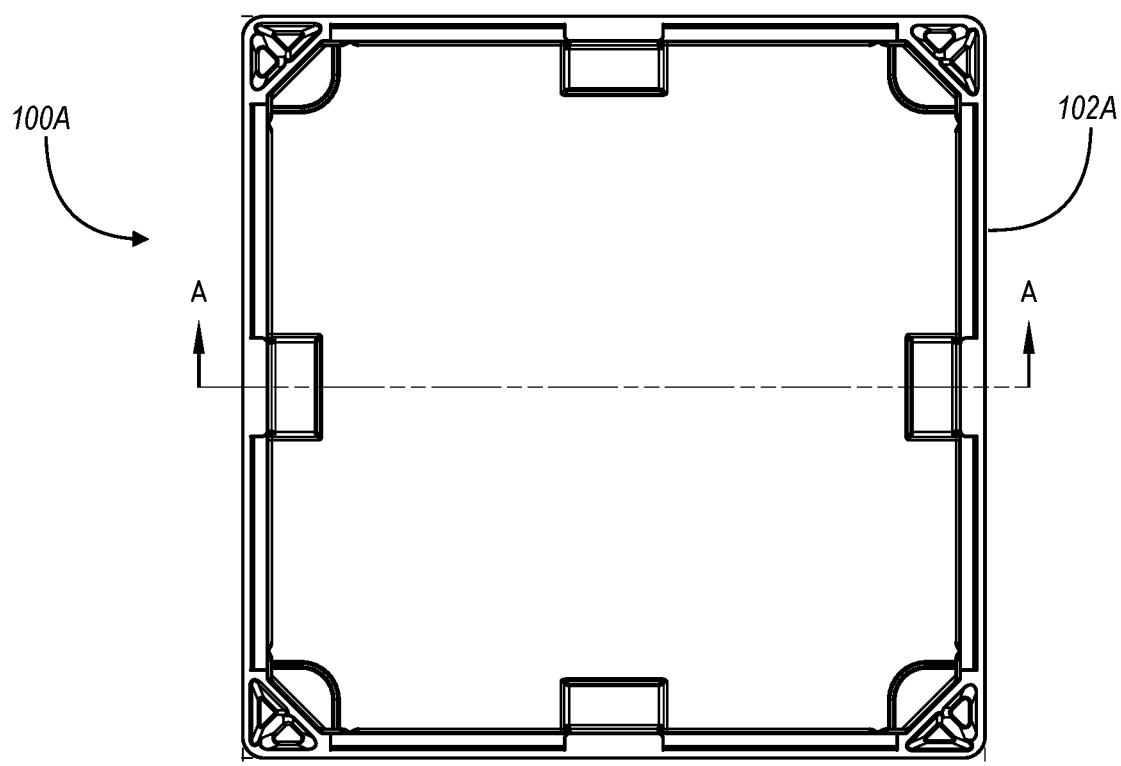
FIG. 6A illustrates a top view of the TLO plant growing system, method, and apparatus of the disclosure described herein.
Figure 6B:
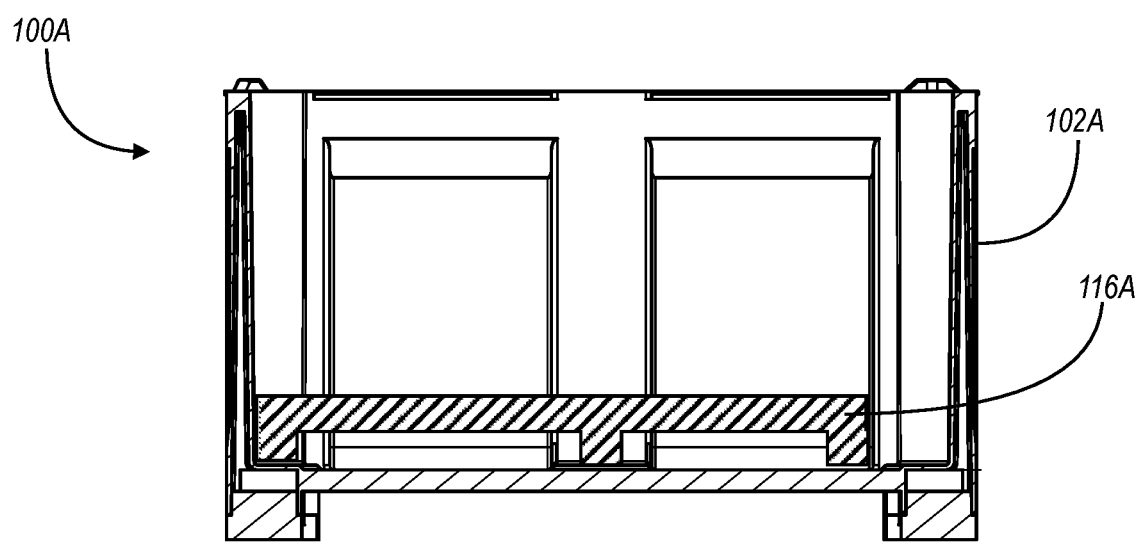
FIG. 6B illustrates a cross-sectional side view for the TLO plant growing system, method, and apparatus of the disclosure described herein.
Figure 7A:
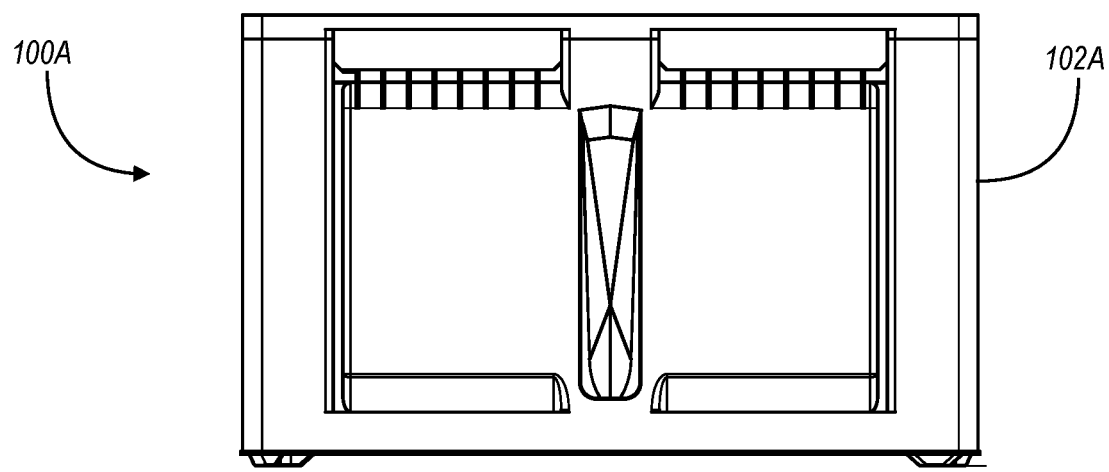
FIG. 7A illustrates a side view for the TLO plant growing system, method, and apparatus of the disclosure described herein.
Figure 7B:
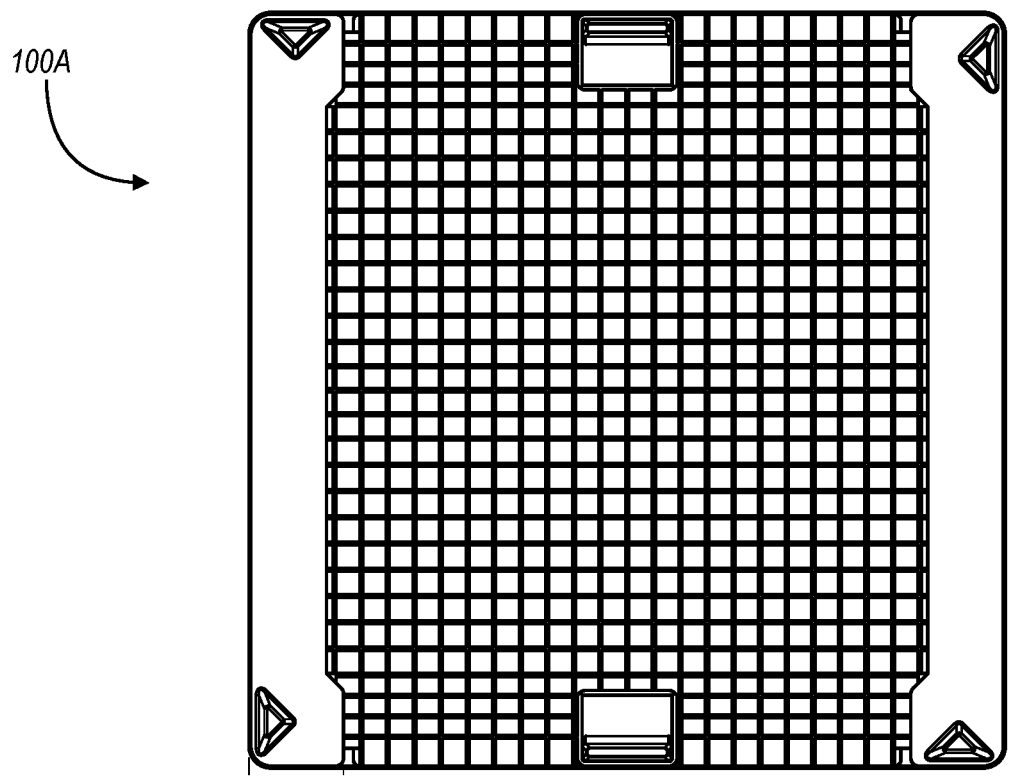
FIG. 7B illustrates a bottom view for the TLO plant growing system, method, and apparatus of the disclosure described herein.
Figure 8A:
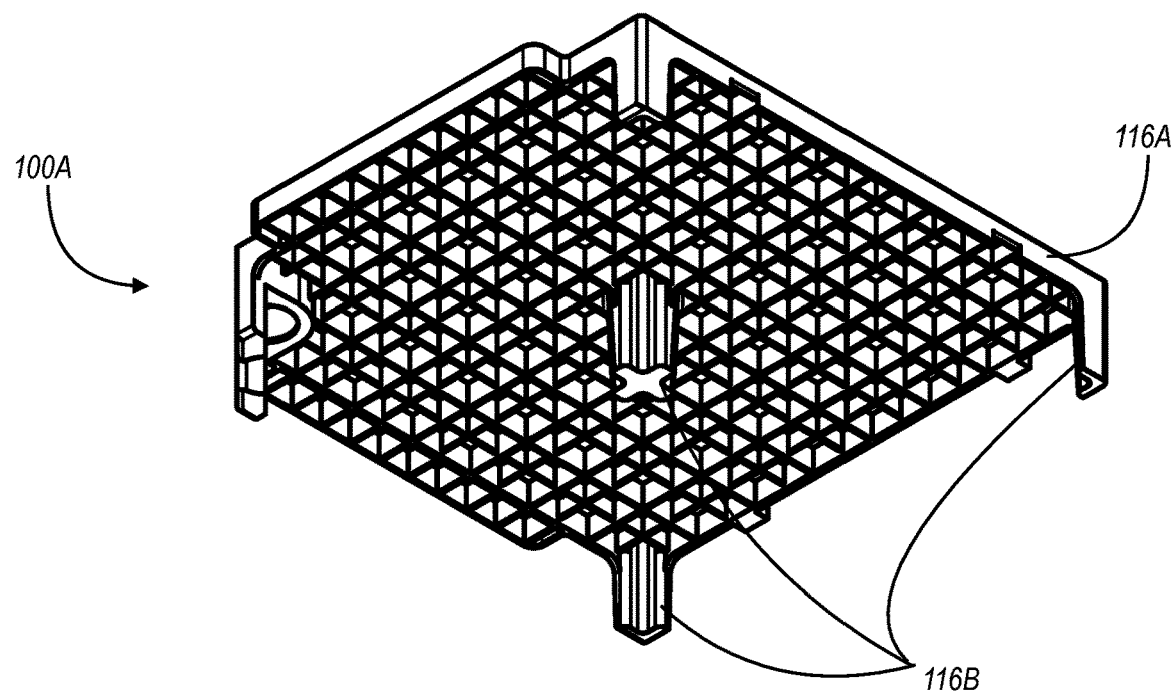
FIG. 8A illustrates bottom perspective view of a platform support for the TLO growing system, method, and apparatus of the disclosure described herein.
Figure 8B:
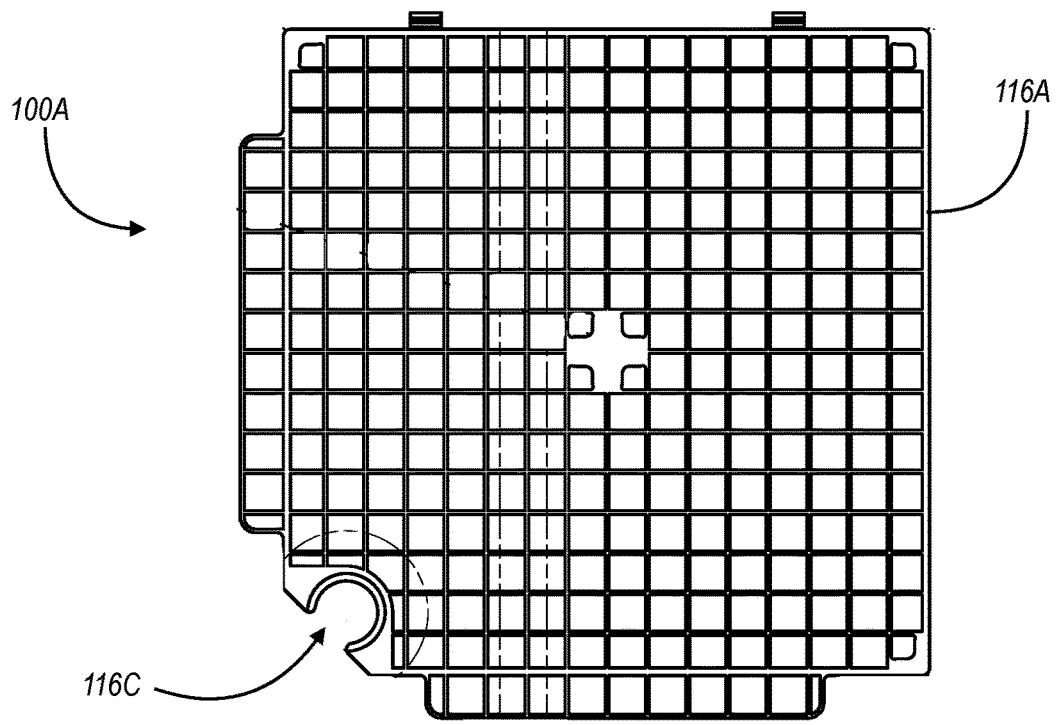
FIG. 8B illustrates a top view of the platform support apparatus of FIG. 8A.

FIGS. 5A-5C illustrate the TLO system, method, and apparatus of the disclosure described herein including a moisture and humidity control system. Here, the TLO system and pod 100A includes the TLO soil 106A with seeds/plants planted therein and disposed in a lower half region of the framed housing or pod. In addition, tubing 130A, such as medical grade tubing, can be secured along the upper portion frame 102A of the TLO system (such as along one of the vertical posts) that can further extend to the lower portion of the frame and allow water 230A to be sent or injected into tubing 130A and directly to the under bed chamber region 300A whereby the deposited water within chamber region 300A increases the moisture and humidity within the chamber. Here, tubing 130A can be further connected to series of additional tubes 130A and be directed to the surface of the TLO soil, while in fluid communication with chamber 300A. In addition, the combination of water, moisture, and humid air 232A within chamber 300A (in addition to the previously disclosed oxygen and carbon dioxide injection systems) can help with controlling such humidity levels to facilitating the growth and maintenance of micro life within the TLO soil from underneath the soil and prevent toxic conditions from developing. In addition, the combination of water, moisture, and humidity may be released to the atmosphere via the outlet regions of tubing 130A, from the bottom to the top. Specifically, the released humid air (or humidity fog) 232A can further help maintain moisture levels within each of the pods as well as facilitating plant growth.

FIGS. 6A-8B illustrate in more detail pod 100A of the TLO system, method, and apparatus of the disclosure described herein. In particular, referring to FIGS. 8A-8B, soil support platform 116A is shown. Here, platform 116A generally includes a rigid grid-like, crisscross, or lattice configured type of structural configuration that can provide vertical and lateral support for the weight of soil 106A above it (FIG. 2B). In addition, platform 116A can be supported by a plurality of upright legs or supports 116B. Here, the height of platform 116A is configured to allow sufficient space underneath it for the ecochamber 300A (FIG. 2B). In addition, platform 116A can further include an at least partially round cut-out or opening 116C in order to receive therein and accommodate at least one of tubing 108A/110A or the inline chamber fan 113A.

Figure 9:
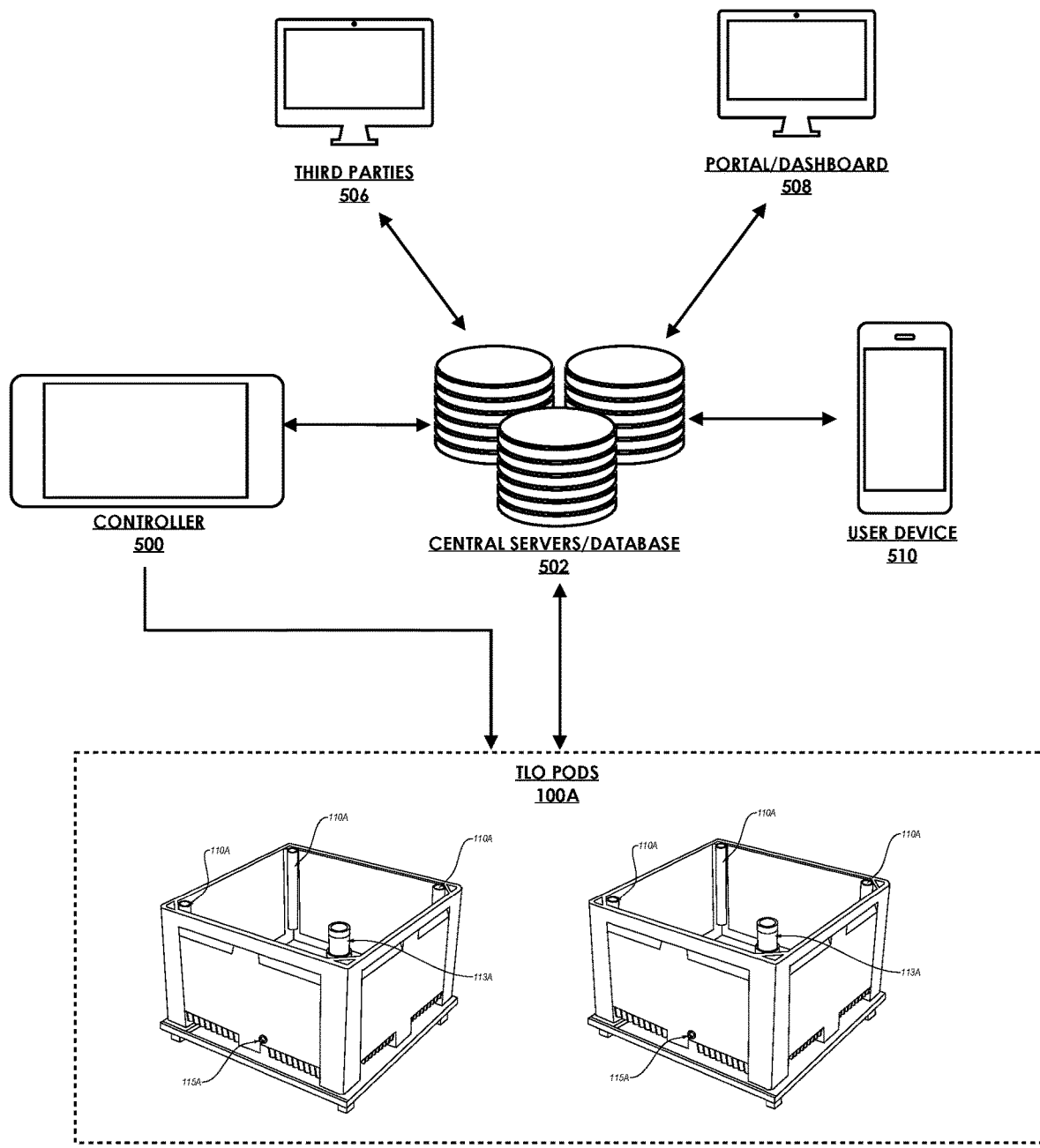
FIG. 9 illustrates a block diagram for one non-limiting exemplary embodiment of a network architecture for automating the TLO plant growing system, method, and apparatus of the disclosure described herein.

In addition, it contemplated within the scope of the present disclosure described herein that the TLO system and pod 100A may also include a wireless humidity sensor relay mounted on the rack or frame region of the pods with humidity sensing probes hung from the top middle rack/frame and suspended inside the plant canopy at optimal sensor reading heights. Here, the humidity levels can be sent wirelessly from the relay to the master control panel and the main pod monitoring computer hub, or controller 500 or servers 502 (FIG. 9). Here, at least one of the oxygen exhaust tubes 110A (FIGS. 2A-2C) can have a ½ in. medical grade watering tube inserted through the tube's exhaust port that leads to the open-air chamber 300A below the soil and above the base of the bed. When the humidity control alerts the system that the humidity level needs to be increased, then the system can be programmed to release water into the open-air chamber 300A system, creating a more humid atmosphere, thereby relinquishing need for aftermarket humidifiers and the costs associated with powering them.

In addition, it is also contemplated within the scope of the present disclosure described herein that the TLO system and pod 100A may also include a watering system. Here, water entering the TLO pods, such as via sprinkler or drip, can come through a hose from overhead that plugs into the pod's watering system coupler at the edge of each pod. Further, a master controller, such as controller 500 (FIG. 9), can control the watering times and amounts based on an irrometer's moisture level readings and normal watering schedules. Here, the TLO system and controller can work with a variety of multiple irrometer soil moisture sensor systems that can wirelessly send moisture levels to the main control panel or controller 500 (FIG. 9). This allows for the gardener to make accurate watering decisions at all points during the process.

In addition, it is contemplated within the scope of the present disclosure described herein, that the TLO system and pod 100A also has the ability to hang multiple 4'×4' bungee cord style trellis frame netting sections within the vertical post frames of the pod. The 4'×4' trellis sections attach on each post of the pod to the trellis hook attachments located up and down the interior vertical posts. The trellis heights can be adjusted by 1-in. increments allowing for multiple trellises to be installed at various heights as the plant grows, even on the same 4'×4' section. Here, the 4'×4' trellis sections can be washable and reusable, which also helps save money and limits waste. Not only this, but the bungie style trellis allows for different heights within a single 4'×4' square. Oftentimes, there can be unequal growth in plant height even within one 4'×4' section. With the foregoing disclosed bungie design, the disclosed system can allow one to make slight adjustments to any corner of the trellis to perfectly position it to where the plant needs support most.

FIG. 9 illustrates a network architecture for an automated control system for the TLO system and pod 100A of the disclosure described herein. In particular, each TLO pod 100A may communicate bi-directionally with one or more controller units 500, wired or wirelessly via a network. Specifically, each controller can have an executable application/software/logic/code operating that allows the TLO system to be automated or function via pre-defined user settings. For example, a user may be able to define various parameters and schedules, such as humidity levels, oxygen levels, carbon dioxide level, watering time, lighting time, among others, for each individual pod for the TLO system 100A. Alternatively, the controller may operate various electro-mechanical or solenoid devices, such as valves, to release water, oxygen, and carbon dioxide within each pod for a pre-defined period (or based on real-time sensor readings and/or input to the controller). In addition, the controller 500 or each pod 100A may further communicate or transmit data/information to a central system 502 for logging, storing, or managing various information. For example, the central servers may host data in the "cloud," such as via Amazon Web Services (AWS) and be accessed via either the controller 500, a portal/dashboard 508, or various third parties 506. In addition, a user device 510, such as a mobile phone, may also have a dedicated "app" that can allow it to communicate with servers 502, controller 500, or directly with each of the pods 100A, such as to retrieve real-time sensor data for each of the pods or operate various control parameters (e.g., watering the plants), among other advantages.

Here it is contemplated within the scope of the present disclosure described herein that any of the components, parts, features, or elements disclosed with respect to FIGS. 1-9 of pod 100A, including but not limited to features 100A-510, can be used in combination with each other as one embodiment or alternative embodiments of the disclosure described herein.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

What is claimed is:

1. A true living organic soil system, comprising:
    a housing adapted to receive soil and one or more plants therein, wherein the housing comprises a floor region:
    a support platform disposed above the floor region of the housing and below the soil, such that the platform comprises an open aerated region between the soil and the floor region, and wherein the open aerated region is adapted to receive oxygen and provide the oxygen to the soil from below:
    an oxygen or carbon dioxide injection module comprised of a tubing that extends from an upper region of the housing and is at least partially disposed above the soil and at least partially below one or more leaves of the plants, and wherein the tubing is adapted to dispense oxygen or carbon dioxide at least partially from below the leaves of the plants:
    a watering module; and
    a lighting module.

2. The system of claim 1, further comprising a circulation fan module, wherein the circulation fan module is configured to divert carbon dioxide gases released from the carbon dioxide module upwards.

3. The system of claim 1, wherein the support platform is comprised of a grid or lattice configuration.

4. A true living organic soil system, comprising:
    a housing adapted to receive soil and one or more plants therein, wherein the housing comprises a floor region;
    a platform disposed above the floor region of the housing and below the soil, such that the platform comprises an open aerated region between the soil and the floor region, wherein the open aerated region is adapted to provide oxygen to the soil from below, and wherein the platform further comprises an at least partial opening or cut-out adapted to at least partially receive the tubing of the oxygen or carbon dioxide module therein; and
    an oxygen or carbon dioxide dispensing module comprised of a tubing disposed within the housing adapted to dispense oxygen or carbon dioxide via a plurality of perforations on the tubing, wherein the tubing is at least partially disposed above the soil in a substantially horizontal configuration within the housing and at least partially below one or more leaves of the plants, and wherein the tubing is adapted to dispense oxygen or carbon dioxide at least partially from below the leaves of the plants.

5. The system of claim 4, further comprising a watering module.

6. The system of claim 4, further comprising a lighting module.

7. The system of claim 4, further comprising a circulation fan module.

8. The system of claim 4, wherein the platform is comprised of a grid or lattice configuration.

9. The system of claim 8, wherein the platform is supported by a plurality of legs.

10. The system of claim 4, wherein the at least partial opening or cut-out is located at a corner region of the platform.

* * * * *